United States Patent [19]
Scanio

[11] 3,907,890
[45] Sept. 23, 1975

[54] PREPARATION OF ALPHA-6-DEOXY-5-HYDROXYTETRACYCLINE

[75] Inventor: Charles J. V. Scanio, Mystic, Conn.

[73] Assignee: Pfizer, Inc., New York, N.Y.

[22] Filed: May 28, 1974

[21] Appl. No.: 473,791

[52] U.S. Cl. ...................... 260/559 AT; 252/429 R
[51] Int. Cl.² ........................................ C07C 103/19
[58] Field of Search ........... 260/559 AT; 252/429 R

[56] References Cited
UNITED STATES PATENTS

| | | | |
|---|---|---|---|
| 3,200,149 | 8/1965 | Blackwood et al. | 260/559 AT |
| 3,444,198 | 5/1969 | Korst | 260/559 AT |
| 3,481,961 | 12/1969 | Pregaglia et al. | 260/683.9 |
| 3,692,864 | 9/1972 | White et al. | 252/429 R |
| 3,717,585 | 2/1973 | Fahey | 260/677 H |

Primary Examiner—Paul M. Coughlan, Jr.
Attorney, Agent, or Firm—Connolly and Hutz

[57] ABSTRACT

A process for the synthesis of α-6-deoxy-5-hydroxytetracycline, a broad spectrum antibiotic, by reduction of 6-methylene-5-hydroxytetracycline using cobalt carbonyl, triphenyl phosphine and hydrochloric acid in a reaction solvent and inert atmosphere.

6 Claims, No Drawings

PREPARATION OF ALPHA-6-DEOXY-5-HYDROXYTETRACYCLINE

BACKGROUND OF THE INVENTION

1. Field of the Invention

This invention relates to a process for the synthesis or the antibiotic α-6-deoxy-5-hydroxytetracycline via reduction of 6-methylene-5-hydroxytetracycline employing dicobalt octacarbonyl, triphenyl phosphine and hydrochloric acid in a reaction solvent medium in which the reagents are soluble.

DESCRIPTION OF THE ART

The reaction of 6-methylentetracyclines, 11a-halo-6-methylenetetracyclines, acid addition salts thereof and polyvalent metal salt complexes thereof with hydrogen in the presence of a heterogeneous noble metal catalyst to produce the corresponding epimeric α- and β-6-deoxytetracyclines is described in U.S. Pat. No. 3,200,149. The use of a poisoned noble metal catalyst to achieve the same conversion but with an increase in the ratio of α- to β-6-deoxytetracycline is reported in U.S. Pat. No. 3,444,198. U.S. Pat. No. 2,984,686 describes the use of catalytic reduction using hydrogen and a noble metal catalyst to achieve only 11a-dehalogenation of 11a-halo-6-methylenetetracyclines. Additionally, reduction of 11a-halo-6-methylenetetracyclines, salts and complexes thereof in the presence of a noble metal catalyst using hydrazines as hydrogen source is reported in German specification No. 2,131,944. British specification No. 1,296,340 describes the use of Raney nickel and Raney cobalt as catalysts for such reductions.

Rhodium halide complexes containing tertiary phosphine or arsine ligands, their preparation and use as homogeneous hydrogenation catalysts are described in U.S. Pat. No. 3,639,439, issued Feb. 1, 1972. Soluble complexes of the platinum group of metals, particularly of rhodium, which contains a halide and a tertiary phosphine, arsine, stibine or amine, their preparation and use as hydrogenation catalysts are also reported in British Pat. Nos. 1,138,601 (published Jan. 1, 1969); 1,219,763 (published Jan. 20, 1971); 1,121,642 (published July 31, 1968); and 1,121,643 (published July 31, 1968); and in U.S. Pat. Nos. 3,489,786 (Jan. 13, 1970) and 3,549,780 (August 5, 1969). Such catalysts are reported to provide an improved process of hydrogenation of unsaturated organic compounds, particularly of olefins, compared to the use of heterogeneous catalysts.

German application OS 2,308,227, published Aug. 30, 1973, describes the preparation of α-6-deoxytetracyclines by homogeneous catalytic hydrogenation using tris(triphenylphosphine)chlorohodium chlororhodium as catalyst. The catalyst can reportedly be preformed or can be prepared directly in the reaction medium by dissolving rhodium trichloride in the medium in the presence of between one and three molar equivalents of triphenylphosphine.

U.S. Pat. No. 3,692,864, issued Sept. 19, 1972, teaches the hydrogenation of unsaturated organic molecules using homogeneous metal complexes of the iron triad type (nickel, cobalt, iron) with tertiary phosphines. Typical of the complexes described is chlorotris(triphenylphosphine)cobalt(I).

Numerous publications indicate homogeneous catalysis is a promising approach to hydrogenation reactions, including regiospecific, selective and asymmetric reductions. Knowles et al., Chem. Commu., p. 1445 (1968), Horner et al., Angew. Chem., Int. Ed., 7, 942 (1968) and Belgian Pat. No. 766,960, published Nov. 10, 1971 report the use of complexes of univalent rhodium with optically-active tertiary phosphine ligands as homogeneous catalysts to achieve asymmetric catalytic hydrogenation. Recent publications presenting rather a comprehensive review of the art: Harmon et al., Chem. Rev., 73, 21–52 (1973); Knowles et al., Chem. Commun., p. 10 (1972); Grubbs et al., J. Am. Chem. Soc., 93, 3062 (1971); Kagan et al., J. Am. Chem. Soc., 94, 6429 (1972); and "Homogeneous Catalysis, Industrial Applications and Implications," Vol. 70, Advances in Chemistry Series, published by the American Chemical Society, Washington, D.C. (1968); "Aspects of Homogeneous Catalysis" Vol. I, pp. 5–75 (1970), edited by R. Ugo and published by Carlo Manfredi, Milan, Italy; and Vol'Pin et al., Russian Chemical Reviews, 38, 273–289 (1969).

Homogeneous catalytic hydrogenation of exocyclic methylene groups in methylenecyclohexanes (Augustine et al., Ann. N.Y. Sci., 158, 482–91 [1969]); coronopilin (Ruesch et al., Tetrahedron, 25, 807–11 [1969]); and in an intermediate in the stereoselective total synthesis of seychellene (Piers et al., Chem. Communs. 1069–70 [1969]) using tris(triphenylphospine)-chlororhodium as catalyst is reported.

All the preceding art references effect the reduction of a substrate by employing hydrogen gas in the presence of some reduction catalyst.

Fichteman, et al., J. Org. Chem., 33, 1281 (1968) and Taylor, et al. J. Org. Chem., 37, 3913 (1972) report the use of cobalt hydrocarbonyl, $HCo(CO)_3$ or $HCo(CO)_4$, as a species capable of reducing olefins or aromatic substrates, said cobalt hydrocarbonyl being formed by reduction of dicobalt octacarbonyl using hydrogen gas at elevated temperatures.

SUMMARY OF THE INVENTION

It has now been discovered that the preparation of tetracyclines of the formula

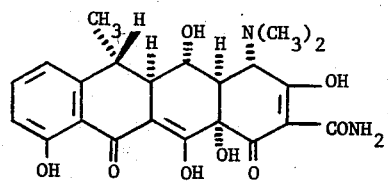

and the hydrochloric acid addition salts thereof, can readily be prepared by contacting a 6-methylene-5-hydroxytetracycline of the formula

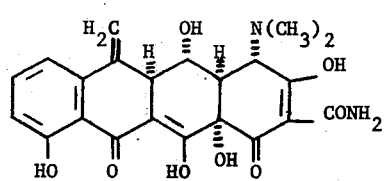

with dicobalt octacarbonyl, triphenyl phosphine and hydrochloric acid in a molar ratio of 6-methylene-5-hydroxytetracycline/dicobalt octacarbonyl/triphenyl phosphine/hydrochloric acid of 1.0/1.0/0.1–0.2/1-

.5–2.0 in a reaction solvent and inert atmosphere at a reaction temperature of 80°–115° C.

Completely unexpected in the process of the present invention is the facile reduction of the exocyclic double bond of the 6-methylenetetracycline without the need for hydrogen gas either in the reaction itself or in the formation of the reaction reagents, as well as the finding that the tetracycline molecule is not destroyed or irreversibly complexed by the reagents $Co_2(CO)_8$, hydrochloric acid and/or triphenyl phosphine.

An equally unexpected finding which renders the present process of commercial interest is the highly specific nature of the reduction, resulting in almost exclusive formation of the antibiotic α-6-deoxy-5-hydroxytetracycline as opposed to the corresponding β-epimer.

DETAILED DESCRIPTION OF THE INVENTION

The aforementioned reduction reaction is depicted in the following scheme:

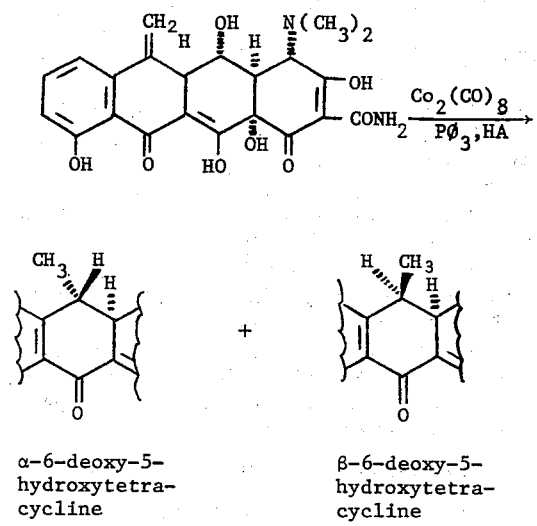

α-6-deoxy-5-
hydroxytetra-
cycline

β-6-deoxy-5-
hydroxytetra-
cycline wherein HA represents a mineral acid, hydrochloric acid.

Experimentally, the reaction is carried out in a reaction solvent. It is preferred that said solvent be of such a nature that all the reactants are maintained in solution under the reaction conditions of the process. Toward this end, it is preferred to employ a solvent for dissolving the dicobalt octacarbonyl and the mineral acid addition salt of the 6-methylenetetracycline. The most practical solvent for this purpose is a mixture of a liquid aromatic solvent, such as benzene, toluene or xylene and an aprotic, highly polar solvent such as dimethylformamide, dimethylacetamide or hexamethylphosphoramide. The aromatic solvents serve as excellent solvents for maintaining the cobalt carbonyl in solution, and polar, aprotic solvents serve a similar role for the 6-methylenetetracycline, the triphenyl phosphine and mineral acid. In employing these solvents for the present process it is preferred that only a minimal amount of said solvents be employed to just solubilize the reactants used. Use of proportionately larger amounts of solvents will, as one skilled in the art can readily appreciate, lead to longer reaction times and allow for decomposition of either the reactants or products formed.

The preferred solvents for the process of the present invention are benzene-dimethylformamide and benzene-dimethylacetamide.

As previously mentioned, it is preferred that the atmosphere above the reaction surface be of an inert nature, not reacting to any appreciable extent with either the starting reagents or products. Such gases as oxygen, air or carbon dioxide have a noticable deleterious effect on the successful formation of the desired products. Accordingly, such gases as nitrogen, argon or helium make suitable atmospheres, those preferred being nitrogen and argon.

Although the reaction temperature range over which this reduction process can be conducted is relatively broad, being from 80–115° C., exceeding these limitations has an adverse effect on the outcome of said reaction. Reaction temperature below 70° C. leads to very slow reduction and often to an incomplete reaction, even after prolonged reaction times, while reaction temperatures in excess of 115° C. cause extensive decomposition of the desired α-6-deoxy-5-hydroxytetracycline product. The preferred reaction temperature, allowing adequate formation of the desired product without extensive decomposition of said product, is from about 90°–95° C.

As one skilled in the art can readily appreciate, reaction times are dependent on a number of reaction variables, including reaction temperature, inherent reactivity of the starting reagents and concentration of the reactants in the solvent medium. By judiciously employing only sufficient solvent to dissolve all the starting reagents, as has been previously discussed, and utilizing a temperature range of 90°–95° c., the reaction process of the present invention is complete in about 4 hrs.

A necessary feature of the present process is the use of a mineral acid. For this purpose hydrochloric acid appears to produce optimum results, although, as one skilled in the art can readily appreciate, other mineral acids such as hydrofluoric, hydrobromic, hydroiodic, sulfuric, sulfurous, phosphoric or nitric can be employed. The 6-methylene-5-hydroxytetracycline starting material can be added as the free base and the hydrochloric acid added separately to the reaction mixture, or alternately, the starting tetracycline can be added as the hydrochloric acid addition salt and additional hydrochloric acid added, if necessary. Due to the poor storability of the starting tetracycline as the free base and the stability and accessability of the hydrochloride salt, the latter is preferred as the starting tetracycline.

Under reaction conditions wherein only one mole or equivalent of hydrochloric acid is employed, the desired α-6-deoxy-5-hydroxytetracycline as the hydrochloride salt is formed, but not in optimum yield or purity. It is preferred, therefore, to employ larger than one molar or equivalent amounts of acid per mole of 6-methylenetetracycline, and accordingly, to achieve this, one can add additional acid to the reaction mixture. Since the α-6-deoxy-5-hydroxytetracycline product is not stable under the reaction conditions of the present process in the presence of too high an acid concentration, it is desirable that no more than 3.5 equivalents of acid per mole of tetracycline be employed, and is further preferred that the amount of hydrochloric acid employed be 1.5–2 equivalents per mole of tetracycline starting material.

Of those aforementioned mineral acids employed in the present process, the preferred mineral acid is hydrochloric acid. Experimentally, when hydrochloric acid is employed, it is often convenient to add the hydrochloric acid or some other mineral acid to a solution of the commercially available 6-methylene-5-hydroxytetracycline hydrochloride, dissolved in a polar, aprotic solvent until the desired proportions of acid are reached.

Another of the starting reagents which profoundly influence the product formation of the present process is triphenyl phosphine. Other phosphines, including trialkyl, tricycloalkyl and substituted triphenyl phosphines, have been employed but without the success associated with triphenyl phosphine. Further, the amount of this reagent employed has a marked influence on the ratio between α-6-deoxy-5-hydroxytetracycline, the preferred product of the present process, and β-6-deoxy-5-hydroxytetracycline. A ratio of 0.1–0.2 equivalents of triphenyl phosphine per mole of 6-methylenetetracycline is operable in providing a favorable ratio between the α- and β-6-deoxy-5-hydroxytetracycline products, with a preferred ratio of 0.1 equivalents of triphenyl phosphine per mole of tetracycline starting material.

Regarding the amount of dicobalt octacarbonyl used in the present process, it has been found that by employing as much as 2 to 5 equivalents per mole of 6-methylenetetracycline offers no advantage over one equivalent in terms of the total reduction as well as the α- and β-6-deoxy-5-hydroxytetracycline distribution in the product. Use of from less than one equivalent to as small as 0.1 equivalent causes a continuous marked reduction in the total amount of products formed. For economic reasons, it is preferred that one equivalent of dicobalt octacarbonyl be employed per mole of starting tetracycline.

The order of combining the reactants for the present process is not critical, although slightly higher reduction yields are obtained employing a procedure wherein the reactants dicobalt octacarbonyl, triphenyl phosphine, the hydrochloric acid and the aprotic, polar solvent are allowed to stir at 85° C. for approximately 10 min. prior to the addition of the 6-methylenetetracycline or hydrochloride salt.

In exploring the scope of the reaction variables of the present process, it is extremely time-consuming to assay the reaction mixture by isolation and identification of the reduction products, and, consequently, time-saving assays such as thin-layer-chromatography and high-pressure-liquid-chromatography are frequently employed.

At the completion of the reaction, the α-6-deoxy-5-hydroxytetracycline product exists in the reaction mixture as the hydrochloride acid addition salt. Regarding isolation of the α-6-deoxy-5-hydroxytetracycline from the reaction mixture, it is preferred that the mixture be filtered and the aromatic solvent removed under reduced pressure. The residual polar solvent is then filtered and treated with a saturated aqueous solution of sulfosalicyclic acid. The subsequent addition of water precipitates the sulfosalicylic acid salts of the reduction products as well as any unreduced 6-methylenetetracycline. Further purification is carried out by recrystallization from methanol-water.

The preferred reaction conditions for the reduction of 6-methylene-5-hydroxytetracycline to a α-6-deoxy-5-hydroxytetracycline employs contacting the above-mentioned tetracycline, dicobalt octacarbonyl and triphenyl phosphine in the molar ratio of 1.0/1/0/0.1 with hydrochloric acid in a solvent of benzenedimethylacetamide or benzene-dimethylformamide in an inert atmosphere of nitrogen or argon at a reaction temperature of 90°–95° C.

The chemistry of tetracyclines and their use as antibiotics in the treatment of various microbial infections is well known and documented extensively in the medical literature. Much of the background on these agents, including α-6-deoxy-5-hydroxytetracycline, and how it is used as a therapeutic agent, is reviewed by R. K. Blackwood, Encyclopedia of Chemical Technology, 20, 1-33 (1969).

The examples which follow are given by way of illustration, and are not to be construed as limitations of this invention, many variations of which are possible within the scope and spirit thereof.

EXAMPLE 1

To 5.5 mg. (0.021 m mole) of triphenyl phosphine in 5 ml. of dry benzene contained in a sealed three-necked flask under a nitrogen atmosphere is added via a syringe through a rubber diaphragm covering a neck opening 360 mg. (1.05 m moles) of dicobalt octacarbonyl in 10 ml. of the same solvent. After stirring for 30 min. at room temperature, 100 mg. (0.21 m mole) of 6-methylene-5-hydroxytetracycline hydrochloride in 10 ml. of dimethylformamide was syringed into the reaction flask, and the resulting solution heated to 70° C. for 18 hrs.

A sample of the reaction mixture is removed and chromatographed on a silica gel plate which has been previously treated with a spray of 0.005 N sodium acetate, 0.002N ethylenediamine tetraacetic acid adjusted to pH 6 with acetic acid and subsequently dried at 110° C. overnight. The chromatography, which is conducted in an ascending system of 95% tetrahydrofuran and 5% water, is developed in ammonia, α-6-deoxy-5-hydroxytetracycline appearing as a yellow spot under a 366 mµ ultraviolet lamp. The results indicate a ratio of α-6-deoxy- to β-6-deoxy-5-hydroxytetracycline of 5 to 1.

The remainder of the reaction mixture is filtered, and the benzene removed under reduced pressure. The residual green solution is filtered, and the filtrate treated first with 2 ml. of a 10% aqueous solution of sulfosalicylic acid followed by 6 ml. of water. The resulting slurry, after stirring for 10 min., is filtered and the solids washed with water and dried.

The solids are dissolved in a minimum amount of water and placed on a high pressure liquid chromatography column packed with a quaternary ammonium substituted methacrylate polymer coated 1% on a controlled-surface-porosity support (U.S. Pat. Nos. 3,485,658 and 3,505,785). The product is eluted with a buffer of 0.005N sodium acetate, 0.002N ethylenediamine tetraacetic acid adjusted to pH 5.8 with acetic acid, under a pressure of 1700 lbs./sq. in. An ultraviolet monitor (254 mµ) at the column exit measures the tetracycline in the eluate. Ultraviolet measurement is, in turn, recorded with a Varian A-25 pen-recorder. Measurements indicate that the yield of α-6-deoxy- and β-6-deoxy-5-hydroxytetracycline is 35–40% of which 83% is the desired α-epimer and 17% of the β-epimer.

EXAMPLE 2

By a procedure similar to that in Example 1, 72 mg. (0.21 m mole) of dicobalt octacarbonyl in 5 ml. of benzene is added to 5.5 mg. (0.021 m mole) of triphenyl phosphine in 5 ml. of benzene under a nitrogen atmosphere followed by 100 mg. (0.21 m mole) of 6-methylene-5-hydroxytetracycline hydrochloride in 10 ml. of dimethylformamide, the mixture being maintained under a nitrogen atmosphere. To the resulting reaction mixture is added 1 ml. of benzene containing 19.6 mg. (0.21 m mole) of sulfuric acid and the mixture heated to 70° C. for 16 hrs. High-pressure-liquid-chromatography assay of the reaction mixture, carried out as in Example 1, indicates that the reduction provides predominantly the α-6-deoxy-5-hydroxytetracycline.

EXAMPLE 3

Substantially similar results are obtained when phosphoric acid, hydrobromic acid, hydroiodic acid and nitric acid are used in place of sulfuric acid in the procedure of Example 2.

EXAMPLE 4

Into a three-necked flask filled with an argon atmosphere is charged 35 mg. (0.13 m mole) of triphenyl phosphine in 0.5 ml. of benzene, 180 mg. (0.52 m mole) of dicobalt octacarbonyl in 4.5 ml. of benzene, and the resulting solution allowed to stir at room temperature for 15 min. A solution of 250 mg. (0.52 m mole) of 6-methylene-5-hydroxytetracycline hydrochloride in 2.5 ml. of dimethylacetamide is added followed by 0.6 ml. of a 1:1 (vol./vol.) solution of dimethylacetamide-12N hydrochloric acid (3.4 m moles), and the reaction mixture heated to 115° C. for 4 hrs.

Following the heating period, the mixture is allowed to cool, and is filtered. The filtrate is evaporated under reduced pressure to remove the benzene and again filtered. A solution of 5.0 ml. of a 10% aqueous sulfosalicylic acid is added to the filtrate followed by 15 ml. of water. The precipitated sulfosalicylic acid salt is filtered and dried, 445 mg. (72% yield). High-pressure-liquid-chromatography assay of a sample of the salts according to Example 1 indicates the product to be 75–80% α-6-deoxy-5-hydroxytetracycline, 1–2% β-6-deoxy-5-hydroxytetraycline and 15–20% unreduced 6-methylene-5-hydroxytetracycline.

The crude product is recrystallized from methanol-water and converted to the hydrochloride salt by addition to an ethanol-water solution containing hydrochloric acid. The precipitated hydrochloride salt is further purified by recrystallization from ethanol containing a minimum amount of water.

EXAMPLE 5

To 27.5 mg. (0.104 m mole) of triphenyl phosphine in 5 ml. of benzene under a nitrogen atmosphere is added 180 mg. (0.52 m mole) of dicobalt octacarbonyl in 5 ml. of the same solvent, 250 mg. of 6-methylene-5-hydroxytetracycline hydrochloride in 5 ml. of dimethylformamide and 18 mg. (0.52 m mole) of hydrogen chloride in 1 ml. of dimethylformamide, and the resulting reaction mixture heated at 85° C. for 3.0 hrs. High-pressure-liquid-chromatography indicates that there is no remaining tetracycline starting material and the reduction is complete.

The reaction mixture is cooled to room temperature and worked-up as described in Example 1. The sulfosalicylic acid salts, 260 mg., consist of 98% α-6-deoxy-5-hydroxytetracycline and 2% β-6-deoxy-5-hydroxytetracycline. The crude sulfosalicylic acid salts are converted to the hydrochloride salts by addition of said salts to ethanol-water containing hydrochloric acid. Further recrystallization from methanol-water provides pure α-6-deoxy-5-hydroxytetracycline hydrochloride.

EXAMPLE 6

The procedure of Example 5 is repeated with the exception that the indicated phosphine is used in place of triphenyl phosphine. The yields represent those of α-6-deoxy-5-hydroxytetracycline (α-doxy), β-6-deoxy-5-hydroxytetracycline (β-doxy) and starting material 6-methylene-5-hydroxytetracycline (methacycline).

| Phosphine | % α-doxy | % β-doxy | % Methacycline |
|---|---|---|---|
| $(C_4H_9)_3P$ | 19 | ~0.3 | 80 |
| $(cycloC_6H_{11})_3P$ | 23 | <1 | 77 |
| $(p—CH_3OC_6H_4)_3P$ | 26–55 | 0.5–3 | 42–74 |
| $(p—FC_6H_4)_3P$ | 38 | ~0.6 | 61 |

EXAMPLE 7

Starting with 27.5 mg. (0.1 m mole) of triphenyl phosphine in 25 ml. of benzene, 342 mg. (1 m mole) of dicobalt octacarbonyl in 10 ml. of benzene, and 399 mg. (1 m mole) of 6-methylene-5-hydroxytetracycline in 40 ml. of dimethylformamide containing 54 mg. (1.5 m moles) of hydrogen chloride, the procedure of Example 1 is repeated to give α-deoxy-5-hydroxytetracycline in comparable yields.

What is claimed is:

1. A process for the preparation of α-6-deoxy-5-hydroxytetracycline hydrochloride which comprises contacting 6-methylene-5-hydroxytetracycline or the hydrochloride salt thereof with dicobalt octacarbonyl, triphenyl phosphine and hydrochloric acid in a molar ratio of 6-methylene-5-hydroxytetracycline/dicobalt octacarbonyl/triphenyl phosphine/hydrochloric acid of 1.0/1.0/0.1–0.2/1.5–2 in a solvent for said reactants and under an inert atmosphere at a reaction temperature of 80°–115°C.

2. The process of claim 1 wherein the reaction temperature is about 90°–95° C.

3. The process of claim 2 wherein the molar ratio of 6-methylene-5-hydroxytetracycline/dicobalt octacarbonyl/triphenyl phosphine/hydrochloric acid is 1.0/1.0/0.1/1.5.

4. The process of claim 3 wherein the solvent is selected from the group consisting of benzene-dimethylformamide and benzene-dimethylacetamide.

5. The process of claim 4 wherein the inert atmosphere is nitrogen.

6. The process of claim 4 wherein the inert atmosphere is argon.

* * * * *